H. W. CLARK.
LUMBER STACKER.
APPLICATION FILED DEC. 19, 1908.

944,946.

Patented Dec. 28, 1909.

3 SHEETS—SHEET 1.

Witnesses
Frank B Hoffman
C. Bradway.

Inventor
Henry William Clark
By Victor J. Evans
Attorney

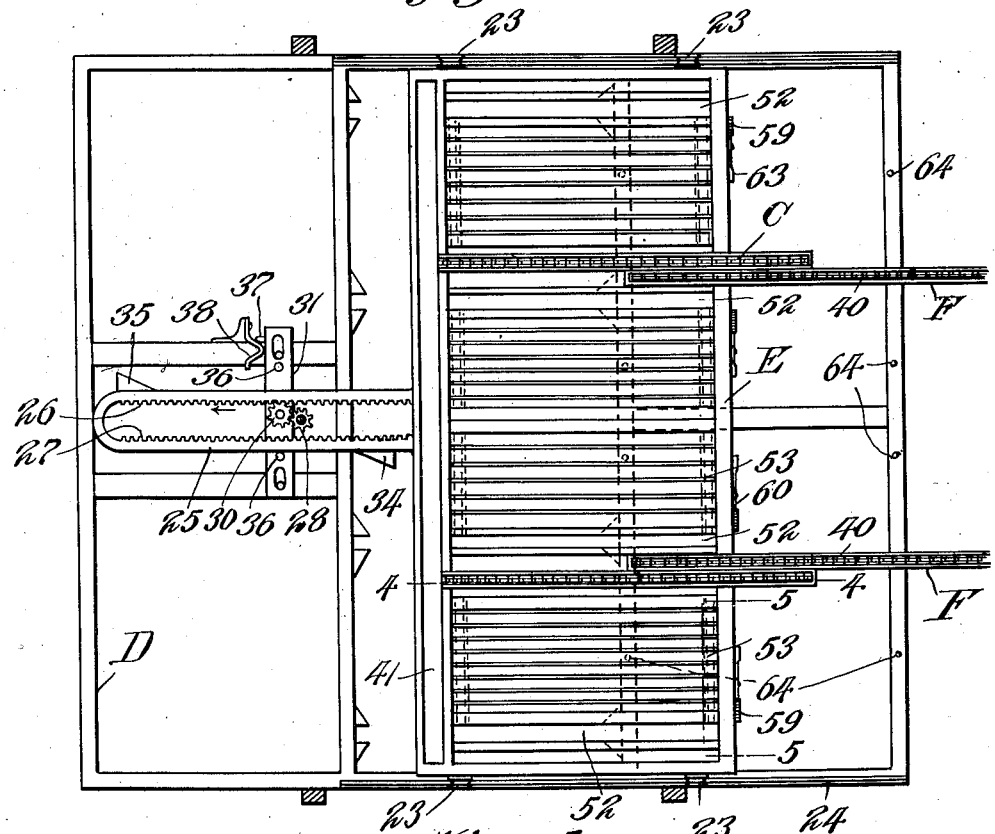

H. W. CLARK.
LUMBER STACKER.
APPLICATION FILED DEC. 19, 1908.

944,946.

Patented Dec. 28, 1909.
3 SHEETS—SHEET 3.

Witnesses
Frank B. Hoffman
C. Bradway.

Inventor
Henry William Clark
By Victor J. Evans
Attorney

UNITED STATES PATENT OFFICE.

HENRY WILLIAM CLARK, OF ST. LOUIS, MISSOURI.

LUMBER-STACKER.

944,946.  Specification of Letters Patent.  Patented Dec. 28, 1909.

Application filed December 19, 1908. Serial No. 468,353.

*To all whom it may concern:*

Be it known that I, HENRY WILLIAM CLARK, a citizen of the United States, residing at St. Louis city, State of Missouri, have invented new and useful Improvements in Lumber-Stackers, of which the following is a specification.

This invention relates to a lumber stacking device of that type which receives the lumber from the trimming machine and stacks the boards in a pile on a truck whereby the lumber can be moved into a kiln for drying.

The invention has for one of its objects to improve and simplify the construction and operation of machines of this character so as to be comparatively simple and inexpensive to manufacture, and reliable and efficient in use.

A further object of the invention is the provision of a novel arrangement of carrier or elevator which is raised step by step as the layers or tiers of lumber are formed.

Another object of the invention is the provision of a carriage mounted on the carrier or elevator for transferring the pieces of lumber from the endless conveyers to the stack forming on the kiln truck, in combination with a novel reversing device for reciprocating the carriage.

An additional object is the employment of devices arranged on the carriage for placing the separating strips upon the uppermost layer or tier of lumber as the layers or tiers are successively completed, the said devices being operated automatically as the carriage reaches the end of its stroke in either direction.

With these objects in view and others, as will appear as the description proceeds, the invention comprises the various novel features of construction and arrangement of parts which will be more fully described hereinafter and set forth with particularity in the claims appended hereto.

Figure 1:
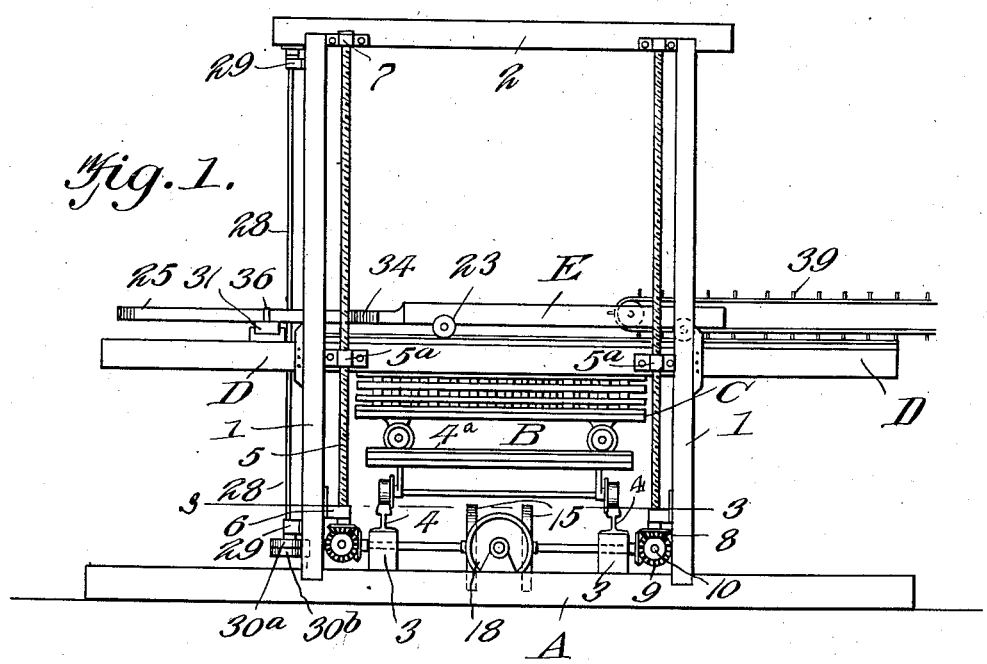
Figure 7:
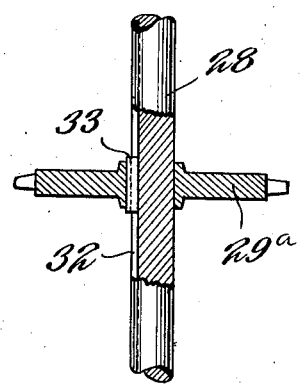
Figure 8:
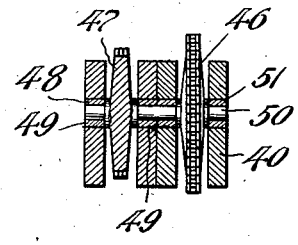
Figure 3:
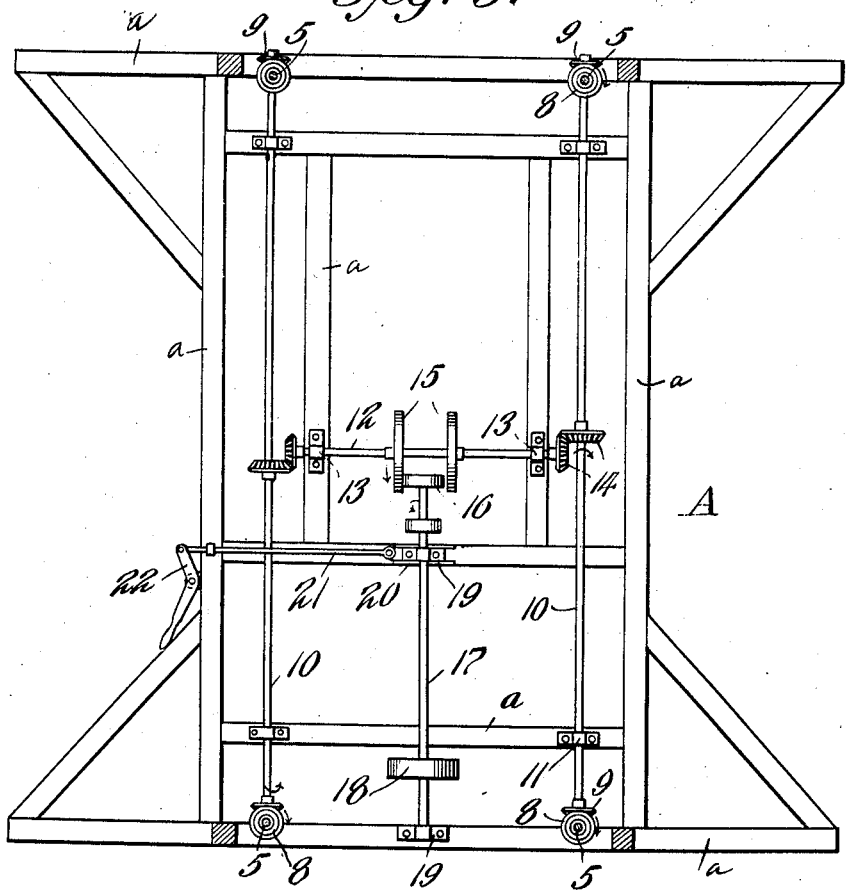
Figure 4:
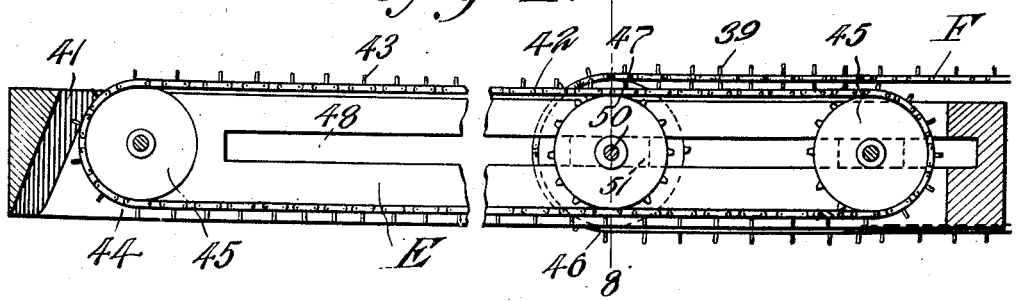

In the accompanying drawings, which illustrate one embodiment of the invention, Figure 1 is a front view of the machine. Fig. 2 is a plan view thereof. Fig. 3 is a horizontal section on line 3—3, Fig. 1. Fig. 4 is an enlarged sectional view on line 4—4, Fig. 2, showing the member-transferring device. Fig. 5 is an enlarged sectional view on line 5—5, Fig. 2, showing one of the spacing strip feeding or placing devices. Fig. 6 is a detail view showing the means for moving the strip-placing devices one step forwardly as the carriage reaches the end of its movement. Fig. 7 is a detail view of a portion of the mechanism for reciprocating the carriage. Fig. 8 is a detail sectional view on line 8—8, Fig. 4.

Similar reference characters are employed to designate corresponding parts throughout the views.

Referring to the drawings, A designates the bed of the machine which is constructed of timbers $a$ suitably arranged to provide a durable and substantial foundation, and mounted on this bed are uprights 1 arranged two at the front and two at the rear in spaced relation to each other and on these uprights is a top frame 2. Extending across the two are beams or sleepers 3 on which are rails 4 over which travels a main truck B. This truck has transversely-extending rails $4^a$ that support a kiln truck C on which the pile or stack of lumber is formed so that the same can be moved on the main truck B to a position in front of the door of the kiln, and when in such position the kiln truck C is moved into the kiln so that the stack of lumber thereon can be artificially dried. Moved vertically in the framework of the machine is a horizontally - disposed open frame structure constituting a carrier or elevator D which supports the lumber-transferring device and the spacing strip-placing devices. The carrier D is supported on vertical elevating screws 5 arranged at the four uprights 1 and are mounted at their lower ends in bearings 6 on such uprights and at their upper ends in bearings 7 on the top frame 2. The screws 5 work in internally-threaded nuts or bearing members $5^a$ at the front and rear of the carrier and the lower ends of the screw shafts 5 are provided with miter gears 8 that mesh with miter gears 9 arranged on horizontal shafts 10. These shafts, as shown in Fig. 3, are arranged to rotate in bearings 11 on the bed of the machine and are simultaneously driven by a central transversely-extending shaft 12 rotatably mounted in bearings 13 on the bed of the machine, there being miter gears 14 between the extremities of the shaft 12 and the shafts 10. The shaft 12 is periodically operated in any suitable manner so that after a layer of the pieces of lumber has been formed on the kiln truck or on the top of the stack, the screws will be turned for raising the carrier a sufficient distance to permit another set of parting strips to be placed on the top of the newly finished layer of lumber. In the present instance, the shaft 12 is provided with spaced friction disks 15 with either of which engages a driving disk 16 disposed between the disks 15. The disk 16 is mounted on a shaft 17 that carries a pulley 18 adapted to be driven from any suitable source of power by a belt. The inner one of the two bearings 19 for the shaft 17 is mounted to slide in a guide 20 and the bearing is connected by a link 21 with a lever 22 or equivalent means whereby the friction element 16 can be thrown toward and maintained in engagement with either of the friction disks 15. During the operation of stacking, the carrier will be moved upwardly step by step and the interval of rest between each step will be sufficient to permit a layer or tier of lumber to be placed on the stack. After the stack is completed, the friction drive is reversed by throwing the friction element 16 into engagement with the other disk 15 and the shaft 17 continuously rotated so that the carrier will be lowered into coöperative relation with another empty kiln truck which will be moved into the stacker after the stack-filled kiln truck is conveyed to the kiln.

Mounted on the carrier B is a carriage E in the form of a rectangular frame which is provided with rollers 23 at its ends that ride on rails or tracks 24 arranged on the carrier, as shown in Figs. 1 and 2. This carrier carries the means for transferring the pieces of lumber from the endless conveying devices to the stack and also supports the devices for placing the spacing strips. The carriage is reciprocated back and forth over the stack so as to successively place the pieces of lumber in position. For this purpose, the carriage is provided with a double rack 25, Fig. 2, extending laterally from the center of one side thereof, the rack being composed of two spaced members having rack teeth 26 and 27 on their opposed faces. Extending upwardly between the rack members 25 is a rotatable shaft 28 mounted in bearings 29, Fig. 1, and on this shaft 28 is a pinion 29ª which meshes with a companion pinion 30 that can be thrown into or out of engagement with either set of rack teeth 26 and 27. The pinion 30 is mounted on a reversing bar 31 suitably mounted on the carrier D. As shown in Fig. 7, the pinion 29ª slides on the shaft 28 so as to move with the carrier as the same is raised or lowered, and the shaft 28 is provided with a key-way 32 in which engages a feather 33 whereby the pinion 29ª is connected with the shaft to rotate therewith. As shown in Fig. 1, the lower end of the shaft 28 is provided with loose and fixed pulleys 30ª and 30ᵇ that are adapted to be driven by a belt from a suitable source of power. On the members 25 are cams or wedges 34 and 35, respectively, which are adapted to alternately engage projections or pins 36 on the reversing bar 31 so that as the carriage E moves in one direction, as for instance to the left, Fig. 2, the wedge 34 will engage the projection 36 located in its path and shift the reversing bar 31 when the carriage reaches the end of its movement so as to thereby throw the pinion 30 out of engagement with the rack teeth 26 and into engagement with the rack teeth 27 to thereby return the carriage. As the carriage reaches the end of its reverse movement, the wedge 35 strikes the other projection 36 on the reversing bar to thereby shift the latter for throwing the pinion 30 into engagement with the rack teeth 26. In this manner, the carriage will be automatically reversed at the end of its movement in either direction. The shift bar is held in either extreme position by a pin 37 arranged to engage either side of a humped leaf spring 38. The leaf spring is secured to the carrier D and as the reversing bar is moved, the spring yields laterally to permit the pin 37 to pass, and as soon as the pin passes to the opposite side of the hump of the spring, the latter returns to normal position so that the hump will lie behind the pin 37 and prevent the reversing bar from shifting while the carriage is moving back and forth.

The pieces of lumber are conducted to the stacking machine from the trimmer of the saw-mill by endless conveyers F in the form of chains having fingers or projections 39 which engage behind the pieces of lumber and gradually move them to the carriage of the stacker. The endless conveyers F are mounted in arms 40 which extend over the carrier at one side thereof and arranged in coöperative relation with these conveyers are transferring devices G which receive the pieces of lumber from the conveyers and carry them to the chute 41 of the carriage.

The devices G are formed of endless chains 42 which, as shown in Fig. 4, are provided with fingers or projections 43 that engage the pieces of lumber and move them to the inclined chute 41. This chute 41 extends the full length of the carriage at one side thereof and the pieces of lumber slide down the chute and are deposited upon the top of the stack, the carriage being moved at a greater rate of speed than the endless elements 42 of the transferring devices so that the pieces of lumber will be placed on the top of the stack in spaced relation so that air channels will be provided between adjacent pieces. The endless elements 42 are mounted in chambered cross pieces 44 attached to the carriage E and in the chambers of the cross pieces 44 are wheels or pulleys 45 over which the chains or flexible elements 42 move. The chains 42 move back and forth with the carriage, while the conveying chains F are relatively stationary, and these latter chains pass around sprocket wheels 46 which serve as drivers for the chains 42, there being sprocket wheels 47 connected with the sprocket wheels 46 so that the chains 42 will be positively driven, the sprocket wheels 47 being located between the pulleys 45 for each chain 42. The cross pieces 44 are provided with longitudinal slots 48 in which are arranged bearings 49 for the shafts 50 of the sprocket wheels 46 and 47. As shown in Fig. 8, the shafts 50 are arranged in fixed bearings 51 on the arm 40 and the slots 48 permit the carriage E to move back and forth without interference from the shaft 50. It will thus be seen that the chains 42 are arranged in overlapping relation with the endless conveyers F so that said chains will at all times be in a position to receive pieces of lumber from the endless conveyers.

On the carriage E are transversely-disposed chutes 52 which are four in number, as shown in Fig. 2, and through these chutes the spacing strips 53, Fig. 2, are discharged upon the top of the stack. The spacing strips are supported on endless chains 54, Fig. 5, that pass over sprocket wheels 55, the chains being provided with pins 56 which engage the strips and move them forwardly toward each chute 52. Coöperating with the chains 54 are tracks 57 on which the ends of the facing strips ride as they are moved toward the chutes. At least two chains 54 are employed for each strip-placing device, and these chains are advanced one step each time the carriage E reaches the end of its movement in either direction. For this purpose, the shaft 58 for one set of the sprocket wheels 55, Fig. 5, is provided with a ratchet wheel 59, as shown in Fig. 6, with which engages a pawl 60 that is carried by a bell crank lever 62 fulcrumed at a suitable point on the carriage E. One arm of the bell crank lever is formed into a shoe 63 which is adapted to engage a projection or pin 64 arranged on a suitable part of the carrier D. There are two sets of pins 64, so that the shoe 63 will be engaged at the end of the movement of the carriage for the purpose of actuating the lever to partially turn the ratchet wheel 59 to advance the strip-carrying chains 54 a distance sufficient to deliver a separating strip to the chute 52. By means of these strip-placing devices, the four strips will be placed in spaced relation on the top of the stack after a layer or tier of lumber has been applied to the stack.

From the foregoing description, taken in connection with the accompanying drawings, the advantages of the construction and of the method of operation will be readily apparent to those skilled in the art to which the invention appertains; and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim is:—

1. In a stacking machine, the combination of a supporting structure, a carrier mounted thereon, means for elevating the carrier step by step, a reciprocatory carriage mounted on the carrier, endless conveyers for delivering lumber from a mill to the stacker, transferring means on the carriage for carrying the lumber from the conveyers to deliver the lumber to the stack, and automatically-actuated means for placing parting strips on the top of the pile after each layer has been placed on the stack.

2. In a stacker, the combination of a supporting structure, an elevator or carrier, elevating screws, reversible means for actuating the screws, a reciprocatory carriage mounted on the carrier, means for delivering pieces of lumber to the carriage whereby the latter places the pieces in layers, and devices actuated by the movement of the carriage for placing strips on top of each layer.

3. In a stacker, the combination of a supporting structure, an elevator thereon, a carriage on the elevator, means on the carriage for depositing pieces of lumber in layers in superimposed relation, and automatically-actuated devices for placing separating strips between the layers.

4. In a stacker, the combination of a supporting structure, a carrier, elevating screws for the carrier, mechanism including a reversing friction gear for operating the screws, a carriage mounted for reciprocation on the carrier, a delivery chute on the carriage, means for delivering pieces of lumber to the carriage, and devices on the carriage for carrying the said lumber from the said means to the delivery chute.

5. In a stacker, the combination of a supporting structure, an elevator, a carriage, a device for reciprocating the carriage, and means for automatically reversing the device by the movement of the carriage to produce continuous reciprocation of the carriage.

6. In a stacker, the combination of a reciprocatory carriage, rack bars on the carriage, a continuously-driven pinion, means for shifting the pinion from one rack bar to the other, and a device controlling the said means by the movement of the carriage.

7. In a stacker, the combination of a reciprocatory carriage, spaced rack bars, a pinion adapted to mesh with either rack bar, means for driving the pinion, a reversing device for moving the pinion into engagement with either rack bar, cams on the rack bars, and projections on the reversing device disposed in the path of the cams to shift the said device at the end of the movement of the carriage in either direction.

8. In a stacker, the combination of a carriage, an elevator on which the carriage is mounted, a pair of spaced rack bars connected with the carriage, a rotatable shaft extending between the rack bars, a pinion slidably mounted on the shaft, a second pinion arranged permanently in mesh with the first pinion and adapted to mesh with either rack bar, and a device controlled by the movement of the carriage for throwing the second pinion into engagement with either rack bar for reversing the movement of the carriage.

9. In a stacker, the combination of a reciprocatory carriage, rack bars connected therewith, a pinion adapted to mesh with either rack bar, means for rotating the pinion, a movable reversing member on which the pinion is mounted, means whereby the carriage adjacent the end of its movement actuates the reversing bar, and a locking device for yieldingly holding the reversing bar in position to maintain the pinion in mesh with either rack bar.

10. In a stacker, the combination of a carriage having a discharge chute extending longitudinally thereof for discharging the pieces of lumber to the stack, a plurality of strip-discharging chutes extending transversely to the carriage, devices for delivering strips periodically to the second-mentioned chutes, and means arranged to be operated by the movement of the carriage by actuating the said devices simultaneously.

11. In a stacker, the combination of a supporting structure, an elevator or carrier mounted thereon, means for raising or lowering the elevator, a carriage, means for reciprocating the carriage on the carrier, endless conveyers for conducting pieces of lumber to the carriage, wheels driven by the conveyers, endless elements arranged to receive pieces of lumber from the conveyers, means for positively driving the said elements from the said wheels, means for mounting the elements on the carriage to move back and forth therewith with respect to the conveyers and wheels, a chute on the carriage adapted to receive the pieces of lumber from the said elements and to deliver the said pieces to the stack in layers, and means for automatically placing separating strips on each layer of the stack.

In testimony whereof I affix my signature in presence of two witnesses.

HENRY WILLIAM CLARK.

Witnesses:
ARTHUR DIGBY,
LAWRENCE McDANIEL.